(12) United States Patent
Watanabe et al.

(10) Patent No.: US 8,355,310 B2
(45) Date of Patent: Jan. 15, 2013

(54) OPTICAL INFORMATION RECORDING METHOD

(75) Inventors: Koichi Watanabe, Hachioji (JP); Kimio Nakamura, Fujisawa (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 191 days.

(21) Appl. No.: 12/545,996

(22) Filed: Aug. 24, 2009

(65) Prior Publication Data

US 2010/0061206 A1    Mar. 11, 2010

(30) Foreign Application Priority Data

Sep. 8, 2008   (JP) ................................. 2008-230127

(51) Int. Cl.
    *G11B 7/00*    (2006.01)
(52) U.S. Cl. ..................... 369/116; 369/47.55
(58) Field of Classification Search ........................ None
    See application file for complete search history.

(56) References Cited

U.S. PATENT DOCUMENTS

| | | | | |
|---|---|---|---|---|
| 6,954,415 B2 * | 10/2005 | Masui et al. | ............... | 369/59.11 |
| 2003/0067857 A1 | 4/2003 | Shirota et al. | | |
| 2004/0223438 A1 * | 11/2004 | Kura et al. | ................. | 369/53.26 |
| 2005/0069002 A1 | 3/2005 | Senga et al. | | |
| 2007/0263513 A1 * | 11/2007 | Tsukuda et al. | ........... | 369/59.11 |
| 2009/0052306 A1 * | 2/2009 | Ikeda et al. | ................... | 369/116 |

FOREIGN PATENT DOCUMENTS

| | | |
|---|---|---|
| JP | 2003-085753 | 3/2003 |
| JP | 2006-048885 | 2/2006 |

* cited by examiner

*Primary Examiner* — Joseph Haley
(74) *Attorney, Agent, or Firm* — Antonelli, Terry, Stout & Kraus, LLP.

(57) ABSTRACT

To solve the problem of deterioration in recording quality due to a change of a write waveform caused by changes of temperature and recording powers, aged deterioration and the like. A driver having a function of controlling rise/fall times and an overshoot amount of an optical waveform is used to optimize an optical waveform that changes in recording under the influence of a component of a laser and the like. Specifically, the rise/fall times and the overshoot amount of the optical waveform are optimized by obtaining a waveform control register value from test recording or a table.

3 Claims, 15 Drawing Sheets

| LD Laser Power | LD Temperature | | | | | |
|---|---|---|---|---|---|---|
| | Low | | Middle | | High | |
| | Rd low | Rd high | Rd low | Rd high | Rd low | Rd high |
| Low | REG1 | REG2 | REG3 | REG4 | REG5 | REG6 |
| Middle | REG7 | REG8 | REG9 | REG10 | REG11 | REG12 |
| High | REG13 | REG14 | REG15 | REG16 | REG17 | REG18 |

|  |  | REG Value |
|---|---|---|
| LD Temperature | Low | REG1 |
|  | Middle | REG2 |
|  | High | REG3 |

| LD Laser Power | LD Temperature | | | | | |
|---|---|---|---|---|---|---|
|  | Low | | Middle | | High | |
|  | Rd low | Rd high | Rd low | Rd high | Rd low | Rd high |
| Low | REG1 | REG2 | REG3 | REG4 | REG5 | REG6 |
| Middle | REG7 | REG8 | REG9 | REG10 | REG11 | REG12 |
| High | REG13 | REG14 | REG15 | REG16 | REG17 | REG18 |

Suggestion flow 3

···2M, 4S, 3M, 2S, 6M, 3S, 5M, 8S, ····

···3M, 3S, 8M, 8S, 3M, 3S, 8M, 8S, ····

US 8,355,310 B2

OPTICAL INFORMATION RECORDING METHOD

CLAIM OF PRIORITY

The present application claims priority from Japanese patent application JP 2008-230127 filed on Sep. 8, 2008, the content of which is hereby incorporated by reference into this application.

BACKGROUND OF THE INVENTION

1. Technical Field

The present invention relates to an optical information recording method for recording information on an optical information recording medium by driving and controlling an optical modulation waveform.

2. Background Art

The storage capacity of optical discs has been increasing, and Blu-Ray Discs (BDs) using blue laser (405 nm) have been marketed in addition to conventional CDs using infrared laser (wavelength of 780 nm) and DVDs using red laser (wavelength of 650 nm).

For example, a write strategy technology employed for DVD-RAMs uses multiple laser pulses having three different power levels as shown in FIG. 17. The three power levels are a write power (Pw), a gap power (Pg) and an erase power (Pe) in descending order of level. When a portion of an optical disc is irradiated with a laser beam of the write power Pw, a recording film in the portion of the optical disc melts. When being rapidly cooled thereafter, the portion of the optical disc becomes amorphous (noncrystalline) and the reflectance of light of the portion drops. This portion is used as a recording mark. When the optical disc is irradiated with a laser beam of the erase power Pe, the recording film of the optical disc becomes crystalline. Accordingly, the portion which has been amorphous before the laser irradiation becomes crystalline, while a portion which has been crystalline from the beginning remains crystalline. Thus, the recording mark can be erased.

The write strategy uses pulses such as a rectangular monopulse employed for CD-Rs, DVD-Rs and the like, a comb-like multipulse (see FIG. 17) employed for CD-RWs, DVD-RWs, DVD-RAMs and the like, a castle-type (non-multi type) pulse employed for high-speed recording of DVD-based optical discs.

A value for determining edge timing of a write waveform shown in FIG. 17 or FIG. 18, and values for determining recording powers such as Pw, Pg and Pe, are called write parameters. Optimal values of the write parameters are predetermined for and prerecorded in each recording medium. For example, in a DVD-RAM, the optimal values are recorded in a physical format information (PFI) area in a control data zone provided in a lead-in area along the inner circumference. This is because optimal values of a group of write parameters differ depending on the composition, the material and the like of each recording medium.

Specifically, to write a recording mark, write parameters are read from the recording medium, a laser pulse is controlled by using the write parameters thus read, and thereby an optimal recording mark is formed. Here, the write parameters read herein include a value for determining edge timing of a write waveform, values for determining recording powers such as Pw and Pg, and values in a shift table. Such a technique is disclosed in Japanese Patent Application Publication No. 2003-85753, for example.

If a recording mark is not formed properly in the recording, recorded data may not be reproduced correctly. For this reason, a recording mark needs to be formed properly. A method which has been employed to form a proper recording mark is to emit a pulsed laser beam and thereby control the heat build-up at the time of irradiating an optical disc recording film with the laser beam. In general, a semiconductor laser diode (referred to as a LD below) for emitting a laser beam is supplied with a pulsed current and thereby emits a pulsed laser beam.

A device which supplies a pulsed current to the LD is a laser driver (LDD). When the laser driver supplies a pulsed current to the LD, the LD emits light according to a light-emitting pattern based on pulse timing of the current supplied to the LD. Thus, the LD emits a pulsed laser beam, consequently forming a proper recording mark. In this description, a pulsed current which the laser driver supplies to the LD is referred to as a current pulse, and a waveform outputted from the LD is referred to as a light-emission pulse, below.

In recent years, the speed of recording data to an optical disc has been increasing every year. In nature, an influence of an electric circuit load between the LD and the laser driver exists to no small extent in the process of supplying a current pulse from the laser driver to the LD, and such an electric circuit load affects the current pulse supplied to the LD. As the width of the current pulse becomes smaller along with the increase of the recording speed, the influence of the electric circuit load between the LD and the laser driver exerted on the current pulse relatively increases, making it more difficult to supply a desired current pulse to the LD. If the desired current pulse is not supplied to the LD, the light emitted by the LD results in having a waveform different from a desired one. Accordingly, this influence appears significantly in a recording mark generated on a recording surface of the disc, and causes deterioration in recording quality. A resistance load of the LD is referred to as a differential resistance of the LD below (see FIG. 19).

As a solving means for the above-described problem, Japanese Patent Application Publication No. 2006-48885 describes a method which makes use of changes of an electrical circuit load between a LD and a laser driver according to temperature. In the method, information on the temperature at the time when the LD is in use or the load of the LD that changes according to the temperature is acquired, and thereby the laser driver generates an appropriate current pulse according to temperature. By supplying the LD with the appropriate current pulse that is generated according to the temperature, an appropriate laser beam can be emitted even if a change occurs in the temperature environment at the time when the LD is in use.

SUMMARY OF THE INVENTION

Japanese Patent Application Publication No. 2006-48885 states that the differential resistance of a LD changes under the influence of temperature. However, the inventor of the present invention found out through an investigation that the differential resistance of a LD changes under the influence of aged deterioration and the light-emission power of the LD, as well. Moreover, in the case of mass-producing products each equipped with a semiconductor laser generator including a LD and a laser driver as those described above, it is expected that the differential resistances of the mass-produced LDs vary in some range. Such changes of the differential resistance of a LD due to aged deterioration, light-emission power, variations among products cannot be followed although the temperature is monitored, and hence an optical waveform cannot be controlled according to the changes. Furthermore, in many cases, a general configuration of an optical disc drive does not include a means for measuring the differential resistance of the LD while the optical disc drive is in use. Accordingly, in such a case, the differential resistance of the LD cannot be measured directly.

The present invention has been made in view of the above-described respects. An object of the present invention is to provide an optical information recording method with which stable recording can be performed even when changes occur in major influential factors such as temperature characteristics, recording powers, and aged deterioration of a LD and a laser driver.

The present invention makes use of a rise time $T_r$, a fall time $T_f$ and an overshoot amount OS of a current pulse shown in FIG. 2. More specifically, a desired optical waveform is always generated from the LD by controlling and optimizing the rise time $T_r$, the fall time $T_f$ and the overshoot amount OS. To achieve this, the control amounts of the rise/fall times and overshoot of a light-emission pulse need to be adjusted by using a laser driver having a function of controlling these parameters, according to changes of the differential resistance of a LD mounted on the laser driver (see FIG. 3). The following two main methods of adjusting the control amount are conceivable.

The first one is a method based on learning in which recording is performed by actually changing the control amounts, and then an optimal control amount is determined from the result of actually reproducing the recorded information. A light-emission waveform recorded by using an actual drive is learned to compensate for temperature changes and changes of the differential resistance of the LD. In the learning, test recording is performed by using at least one write pattern. On the basis of the characteristics of a reproduction signal obtained from the test recording, optimal control amounts for the rise/fall times and overshoot are obtained. The second one is a method of preparing a table for determining the control amounts according to each condition such as temperature, the differential resistance of the LD, and LD power.

The present invention relates to an optical information recording method for recording information by emitting a pulsed laser beam from a laser light source and thereby forming a recording mark on a recording medium. The method includes the steps of: optimizing a recording power; performing test recording on the recording medium while changing a value set in a waveform control register of a laser driver which drives the laser light source and thus by changing a shape of a current pulse with which the laser light source is driven; reproducing information recorded in the test recording; obtaining an optimal value of the value set in the waveform control register, on the basis of a relationship between the value set in the waveform control register and a recording quality; setting the obtained optimal value in the waveform control register; and recording information by forming a strategy with a pulsed laser beam generated from the laser light source driven by the laser driver. Here, the waveform control register adjusts at least one of a rise time, a fall time and an overshoot amount of a light-emission pulse.

Moreover, an optical information recording method of the present invention includes the steps of: acquiring information on temperature, a recommended recording power of a recording medium and a differential resistance of a laser light source to be used; obtaining a register value corresponding to the acquired information, by referring to a table in which a register value to be set in a waveform control register of a laser driver which drives the laser light source is stored in association with a combination of the temperature, the recording power and the differential resistance of the laser light source; setting the obtained register value in the waveform control register of the laser driver; and recording information by forming a strategy with a pulsed laser beam generated from the laser light source driven by the laser driver.

In this case, after the step of setting the obtained register value in the waveform control register of the laser driver, the following steps may be performed first before the step of recording information by forming a strategy with a pulsed laser beam, the steps are: optimizing a recording power; performing test recording on the recording medium while changing the value set in the waveform control register of the laser driver which drives the laser light source and thereby changing a shape of a current pulse with which the laser light source is driven; reproducing information recorded in the test recording; obtaining an optimal value of the value set in the waveform control register, on the basis of a relationship between the value set in the waveform control register and a recording quality; and setting the obtained optimal value in the waveform control register.

The present invention exerts a great effect at the time of high-speed recording in which rises and falls of a waveform can be considerations or in the case of writing to a rewritable disc. Application of the present invention is particularly preferable to an optical disc storage system whose transfer speed is 100 Mb or more per second.

According to the present invention, a proper recording mark can be formed by accurately compensating the shape of an optical output waveform that is deteriorated by performance variations, aged deterioration and temperature characteristics of a laser driver of an optical disc drive.

DESCRIPTION OF THE PREFERRED EMBODIMENTS

Embodiments of the present invention will be described below with reference to the drawings.

Embodiment 1

Figure 4:
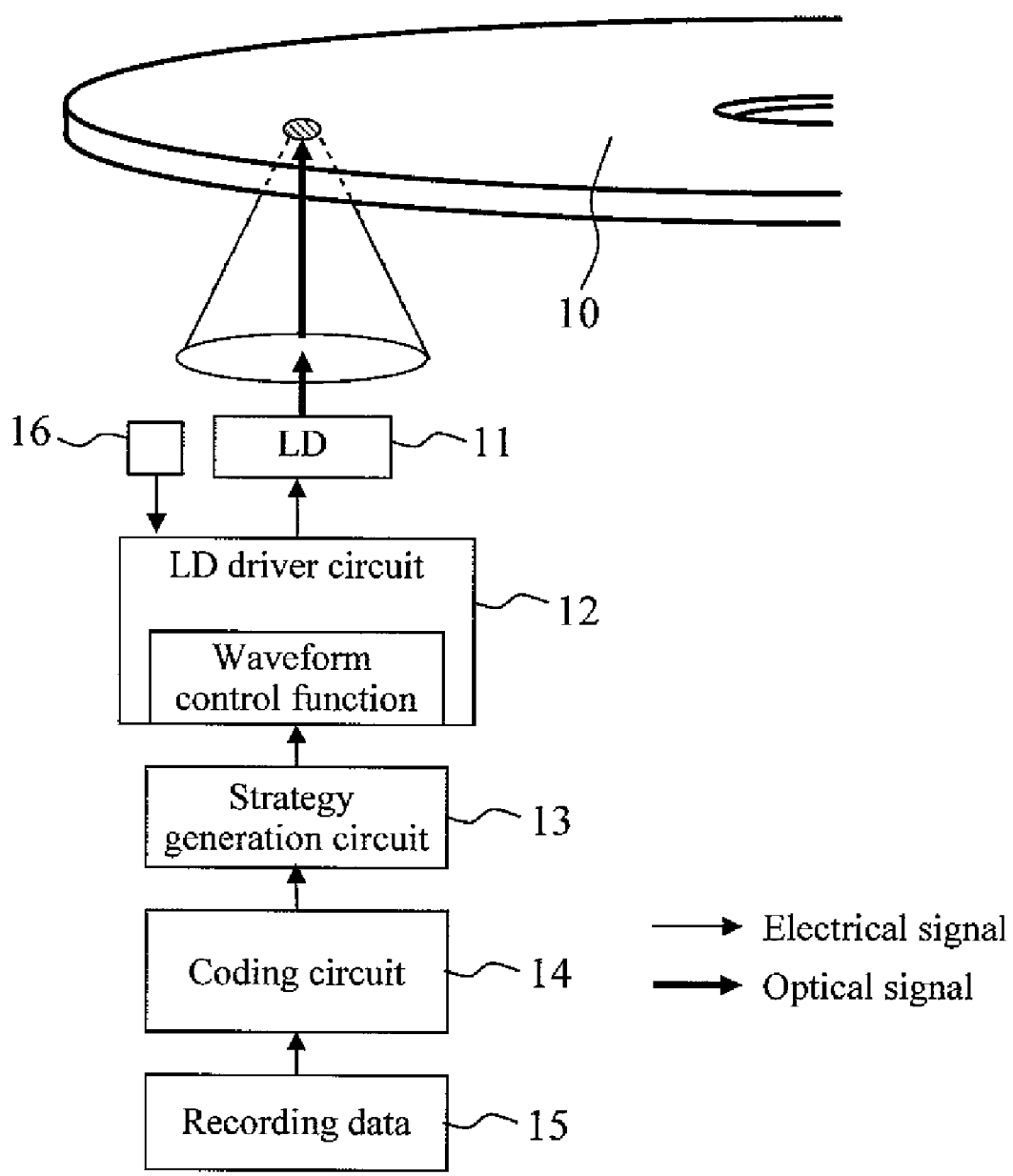
FIG. 4 is a schematic diagram showing a flow until recording of a write signal to an optical disc (in the case where a laser driver does not have a strategy generation function).
Figure 5:
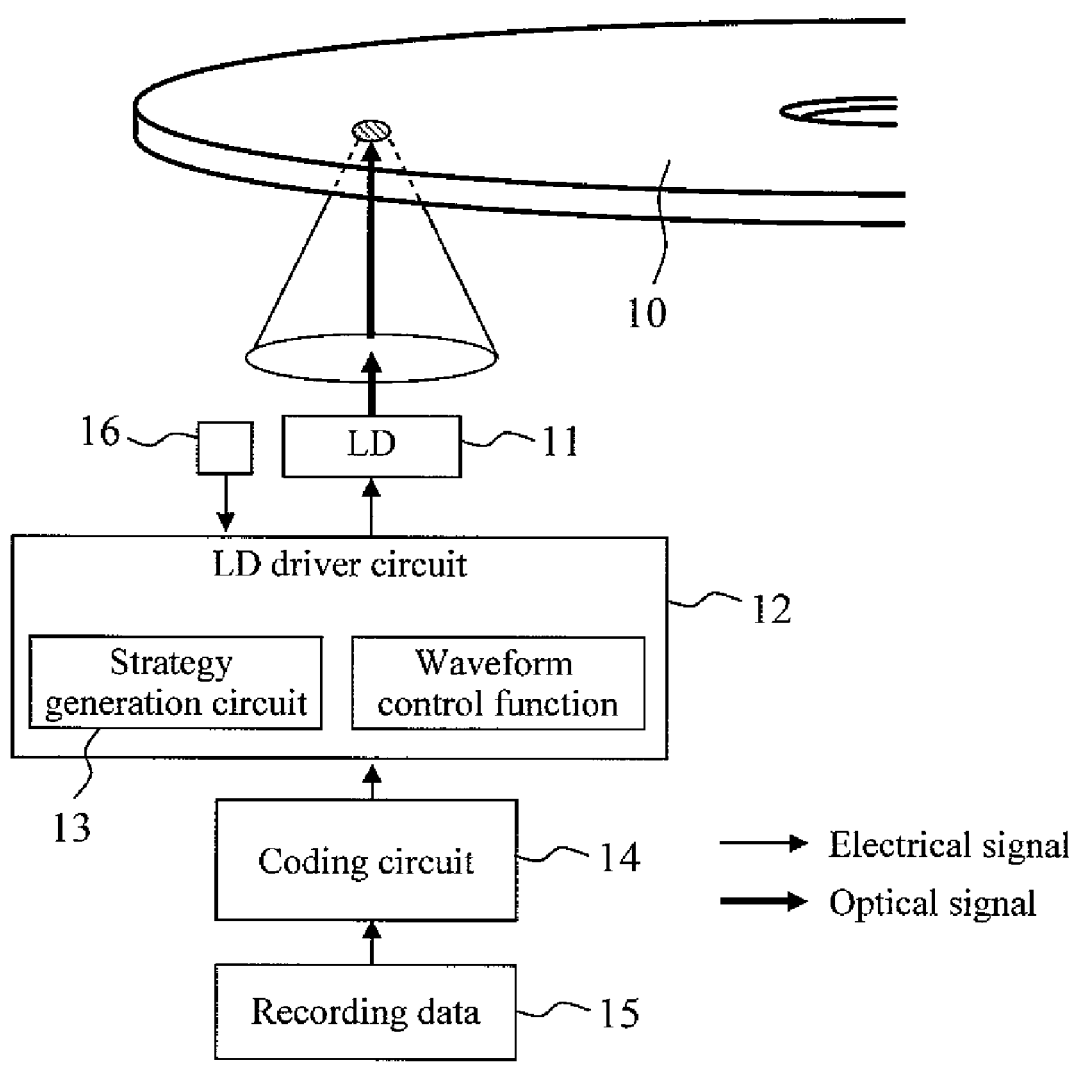
FIG. 5 is a schematic diagram showing a flow until recording of a write signal to the optical disc (in the case where the laser driver has the strategy generation function).
Figure 6:
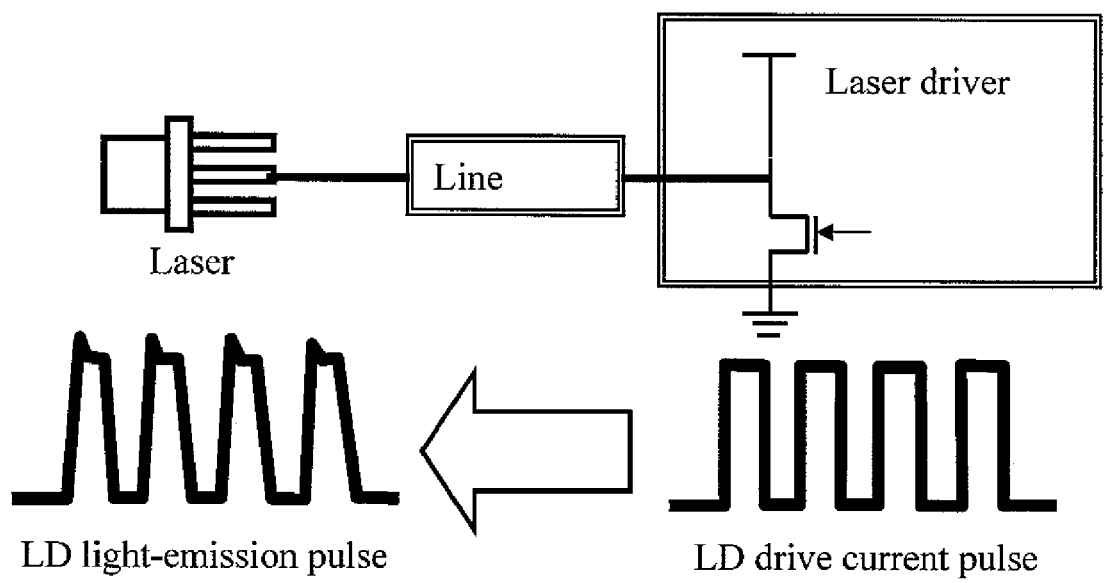
FIG. 6 is a diagram showing a relationship between a LD drive current pulse and a LD light-emission pulse.

First, a light-emission pulse learning method will be described. FIGS. 4 and 5 are schematic diagrams each showing a flow until recording of a write signal to an optical disc. In the present invention, a laser driver may simply have a function of outputting a current upon receipt of a register instruction as shown in FIG. 4, or may have, in addition to the function, a strategy generation circuit as shown in FIG. 5. Input data is coded in a coding circuit, and is converted, in the strategy generation circuit, into a signal forming a strategy that allows the coded signal to be written to the disc. Accordingly, in FIGS. 4 and 5, a power register is included in the strategy generation circuit. The resultant signal is inputted to the laser driver. FIG. 6 is a schematic diagram showing a relationship between a drive current pulse generated by the laser driver and a light-emission pulse outputted from a LD. As shown in FIG. 6, a current waveform is transmitted to the LD from the laser driver, and used as a laser light-emission waveform.

In the recording, write parameters need to be optimized between a recording medium and a recording device. This requires an operation for optimizing the strategy (referred to as "strategy learning" below) or the like such that a jitter or the number of errors of a reproduction waveform to serve as a recording quality index would be minimum when recording is performed on a recording medium and the recording area is reproduced on the basis of, for example, write parameters that are provided by the media manufacturer and are written in the media. In the present invention, waveform control learning is performed before this strategy learning.

Figure 1:
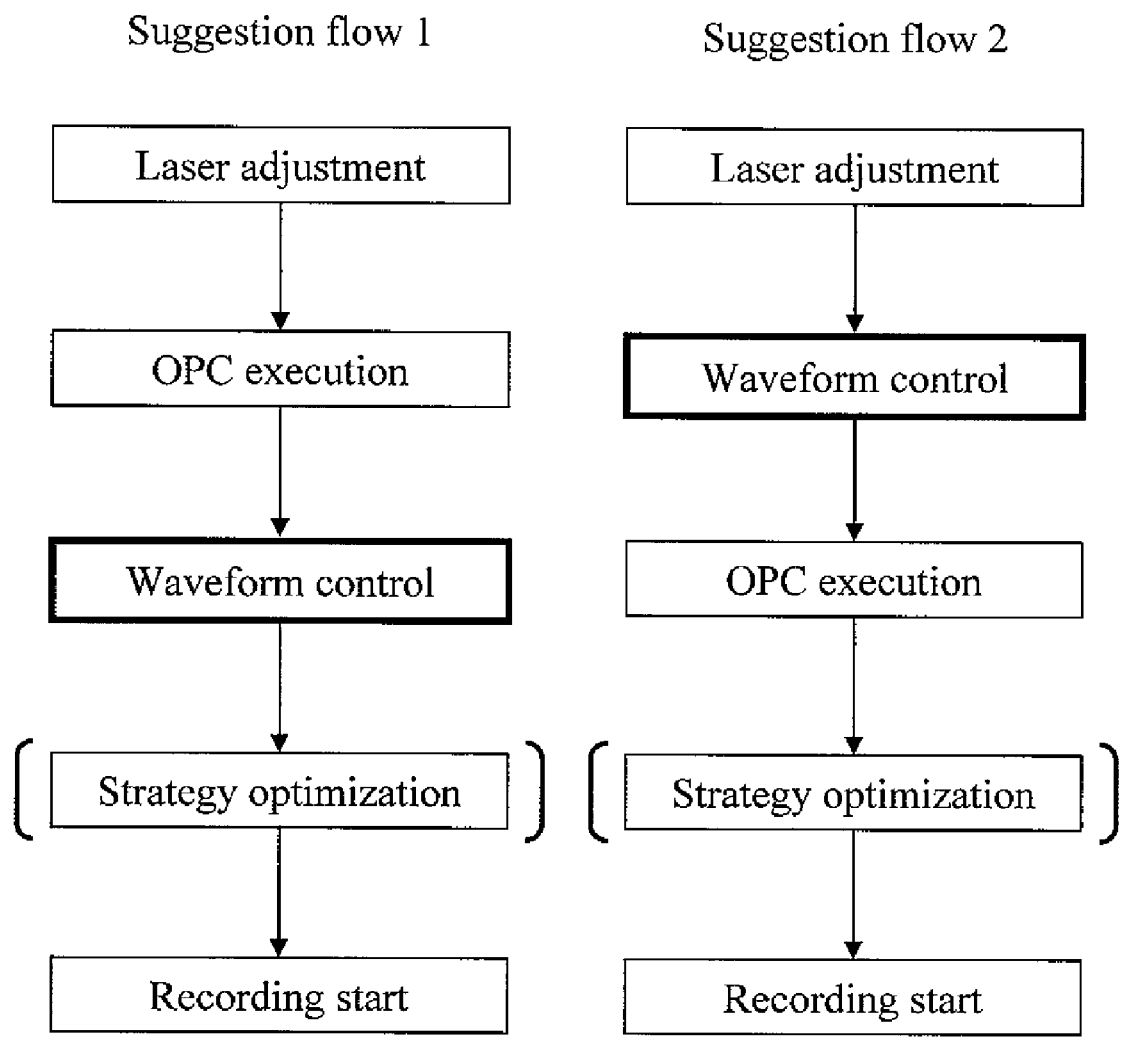
FIG. 1 is flowcharts each showing an example of a control sequence according to the present invention.
Figure 2:
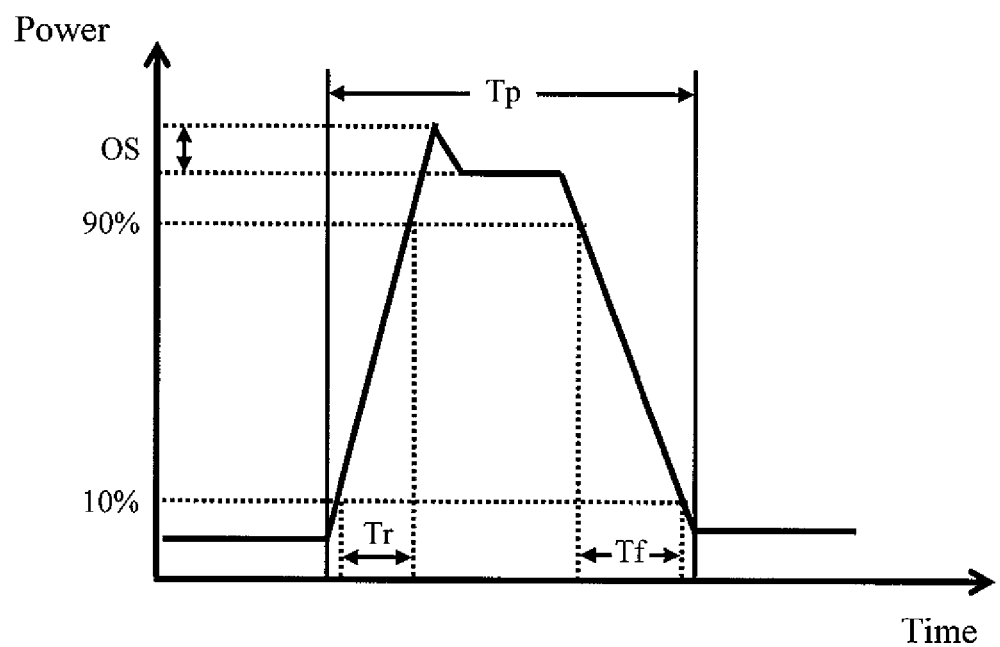
FIG. 2 is a graph for explaining a rising time, a falling time and an overshoot amount of a light-emission pulse.
Figure 3:
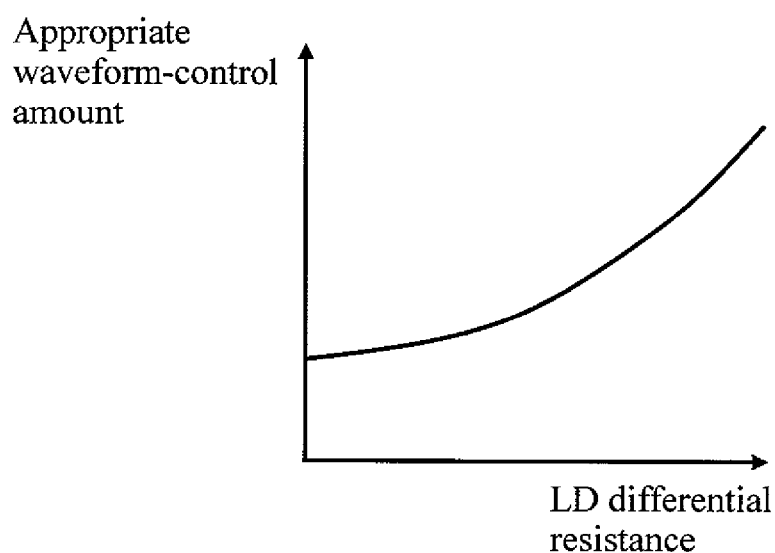
FIG. 3 is a graph showing dependency of an appropriate waveform-control amount on a LD differential resistance.

A description will be given by using Flow 1 shown in FIG. 1. A control sequence of this case is as described in (1) to (4) below.

(1) As preparation for recording, a relationship between an output current from the laser driver and laser emission is obtained by laser power adjustment.

(2) Then, optimization of a recording power, called optimum power control (OPC), is performed.

Figure 7:
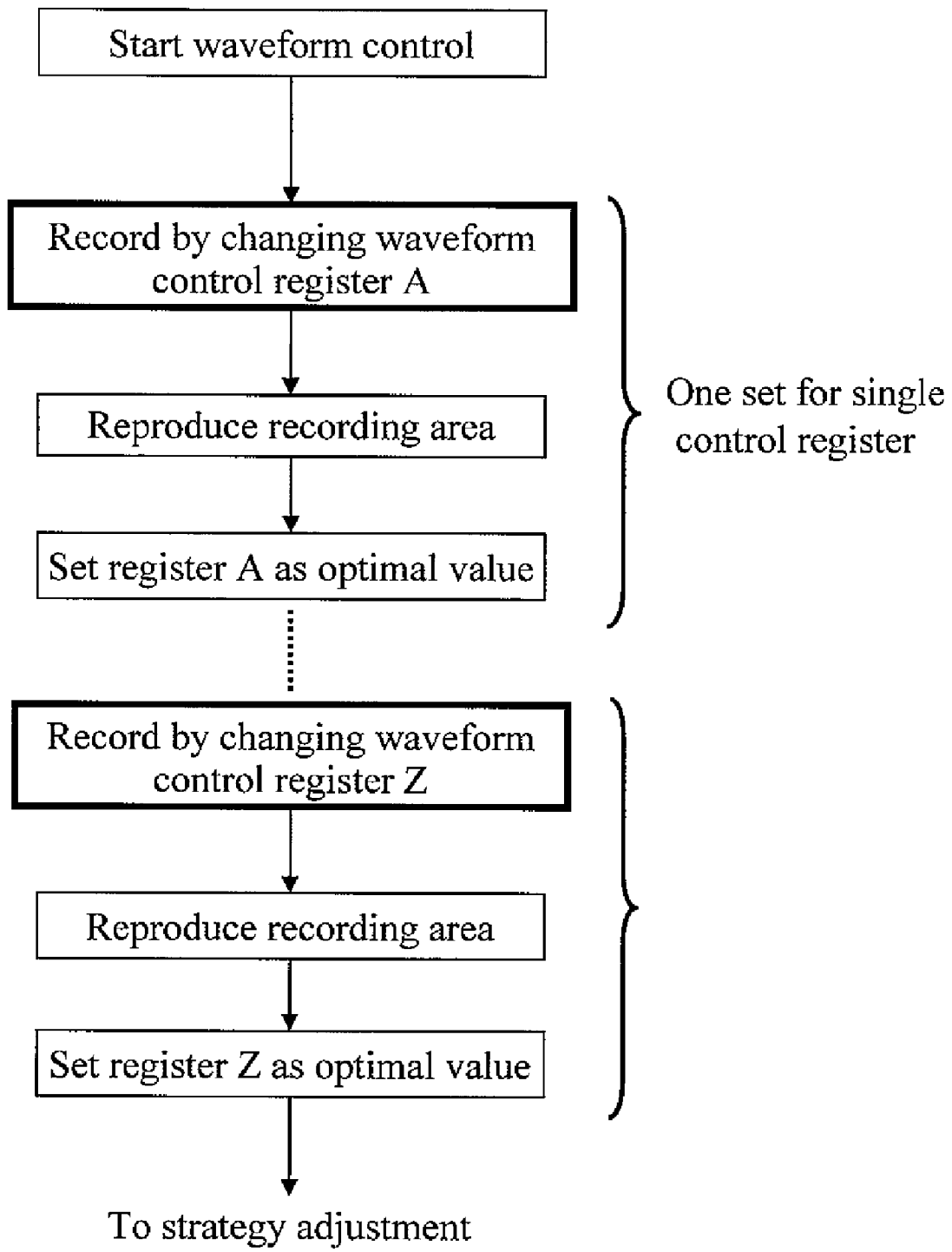
FIG. 7 is a flowchart showing a procedure of learning of waveform control.

(3) Although strategy optimization is performed or recording is directly performed next in a conventional flow, waveform control is performed next in the present invention. FIG. 7 shows a procedure of the waveform control learning. The waveform control learning is performed as follows. Specifically, multiple patterns are recorded by changing a control register value of the laser driver having a waveform control function. Then, the recorded patterns are reproduced, and thereby an optimal value of the control register value is extracted on the basis of an appropriate index.

Figure 8:
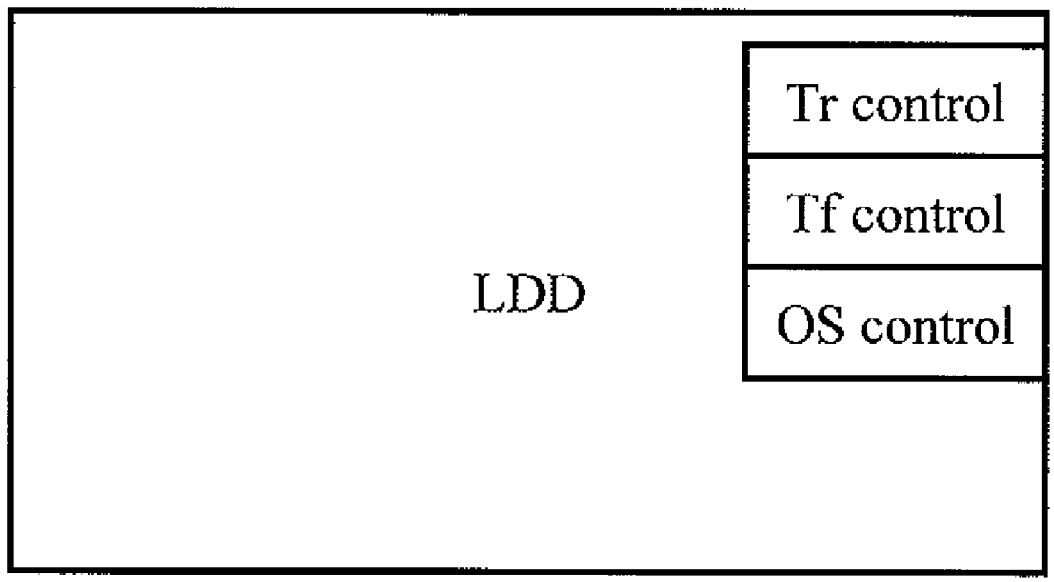
FIG. 8 is a schematic diagram showing an example of the laser driver.
Figure 9A:
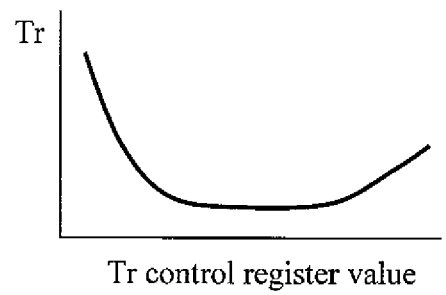
FIGS. 9A, 9B and 9C are graphs each showing dependency of the rise time $T_r$, the fall time $T_f$ or the overshoot amount OS of the light-emission pulse on a corresponding control register value.
Figure 9B:
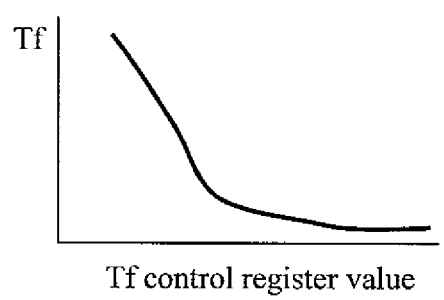
Figure 9C:
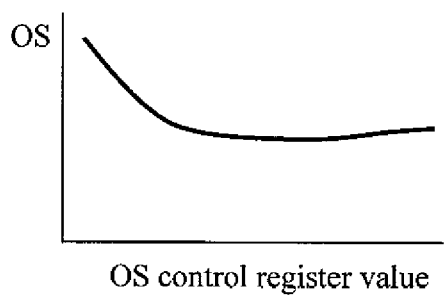

FIG. 8 is a schematic diagram showing an example of the laser driver including control registers. The laser driver shown in FIG. 8 includes: a $T_r$ control register for controlling a rise time of a light-emission pulse; a $T_f$ control register for controlling a fall time thereof, and an OS control register for controlling an overshoot amount thereof. FIGS. 9A, 9B and 9C are graphs each showing an example of dependency of the rise time $T_r$, the fall time $T_f$ or the overshoot amount OS of the light-emission pulse on the control register value. In the case of using the laser driver having the waveform control function, by changing the value of a control register, the waveform parameter corresponding to the control register can be controlled and optimized as shown in FIG. 9.

Figures 10, 11, 12:
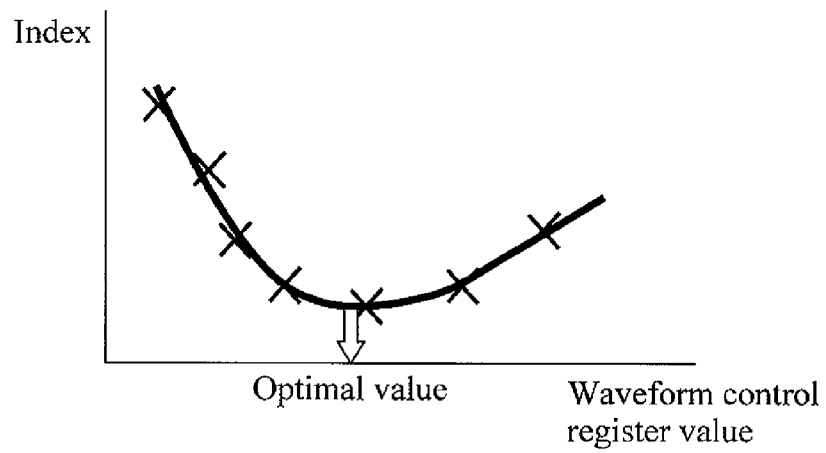
FIG. 10 is a graph showing a method of optimizing a waveform control register value.
FIG. 11 is a table showing examples of waveform control parameters (registers) with respect to temperature variations.
FIG. 12 is a table showing examples of the waveform control parameters (registers) with respect to temperature, LD power and differential resistance.

For example, to optimize the rise time of the light-emission pulse, multiple patterns are recorded by changing a set value of the $T_r$ control register. In this event, current pulses each having a different rise time $T_r$ according to the $T_r$ control register value are obtained as shown in FIG. 9A. Then, a recording mark is formed by an optical waveform generated by the LD driven with each of the current pulses. Then, by reproducing the recorded patterns, a relationship between the $T_r$ control register value and the recording quality index is obtained as shown in FIG. 10. As the recording quality index, a jitter or an error rate of the reproduced waveform can be used. When the optimal value of the $T_r$ control register is thus obtained, the optimal value is set in the $T_r$ control register. Thereby, optimal control is performed on the rise time $T_r$ of the light-emission pulse.

Subsequently, multiple patterns are recorded by changing the value of another control register, for example, the $T_f$ control register. The optimal value of the $T_f$ control register is obtained on the basis of recording quality indices obtained by reproducing the multiple patterns, and the optimal value is set in the $T_f$ control register. Thereby, optimal control is performed on the fall time $T_f$ of the light-emission pulse. Further, the optimal value of the OS control register for controlling the overshoot amount OS is obtained in the same way, and the obtained optimal value is set in the OS control register. Thereby, optimal control is performed on the overshoot amount OS of the current pulse.

In this manner, optimization of one or more registers is performed. It is to be noted that, although optimization is performed for the rise time $T_r$, the fall time $T_f$ and the overshoot amount OS in this embodiment, the kinds and the number of control registers usable for the waveform control depend on the laser driver to be used. In any case, what is only needed is to obtain, by learning, the optimal value of each of waveform control registers of the laser driver to be used, and to set the obtained optimal value in the control register.

(4) The procedure advances to optimization of the strategy or directly to a recording operation, depending on the waveform optimized by the waveform control learning.

This method, employing the waveform control based on learning, can handle changes in the properties of components such as the LD and a driver circuit due to temperature changes in the drive, changes in the dependency of the differential resistance of the LD on powers, aged deterioration of components, and the like.

Embodiment 2

Embodiment 2 will be described by using a sequence of Flow 2 in FIG. 1. In general, properties of a laser driver and a LD made of a semiconductor change by temperature. Due to such temperature characteristics, the rise time/fall time and the overshoot amount described above change. Changes of a differential resistance attributable to the temperature changes are measured in advance, and a temperature table storing optimal register values for temperatures is prepared. FIG. 11 shows an example of a table for waveform control according to temperature. This table includes optimal values of a rise time $T_r$, a fall time $T_f$ and an overshoot amount OS as waveform control parameters at typical temperatures such as 0° C., 25° C. and 50° C.

A control sequence of this embodiment is as follows.

(1) As in Embodiment 1, a relationship between an output current from the laser driver and laser emission is obtained by laser power adjustment.

(2) Then, different from Embodiment 1, light-emission pulse control is performed before OPC. Here, a method based on learning including recording and reproduction cannot be employed since even optimal recording powers are not determined. Accordingly, by referring to a table such as that shown in FIG. 11 on the basis of the temperature obtained by a temperature sensor 16, registers for $T_r$, $T_f$ and OS are set. If the waveform changes according to laser power and the differential resistance (Rd) of the LD in addition to temperature, a table as one shown in FIG. 12 is created to include set magnitude of laser power and states of differential resistance (Rd) amount, and the table is referred to.

(3) Then, OPC, which is optimization of recording powers, is performed.

(4) The procedure advances to optimization of the strategy or directly to a recording operation, depending on the waveform optimized by the waveform control learning.

Figure 13A:
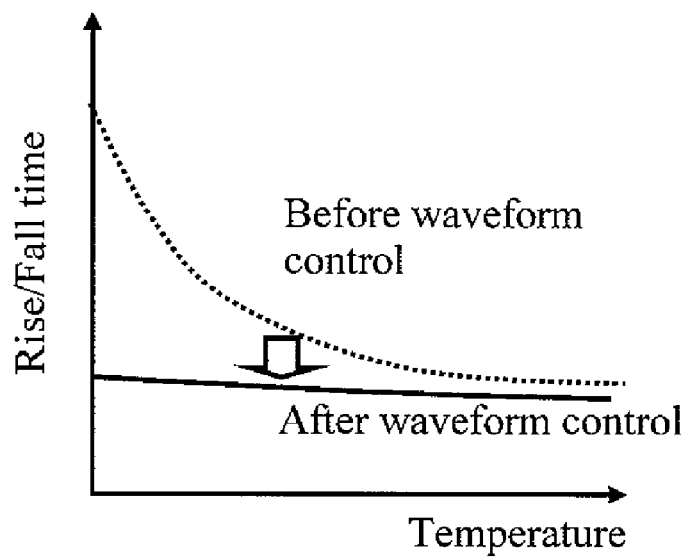
FIGS. 13A and 13B are graphs each showing changes of the rise/fall times or changes of the overshoot amount of the light-emitting pulse with respect to temperature.
Figure 13B:
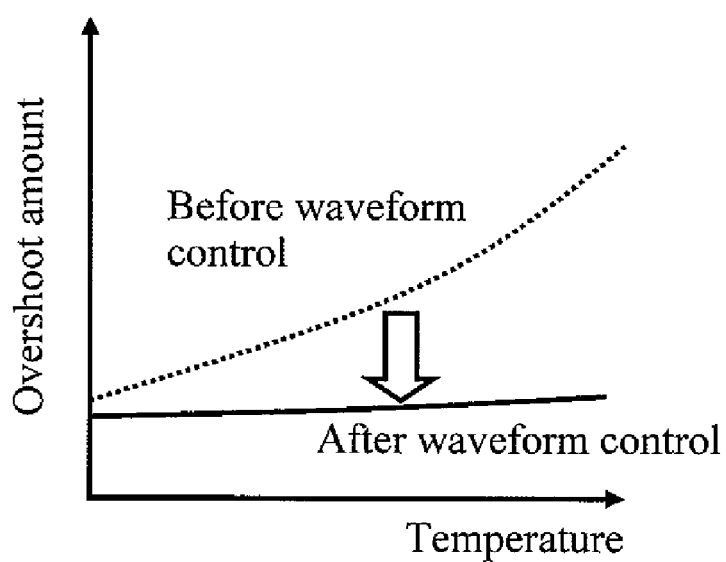
Figure 14A:
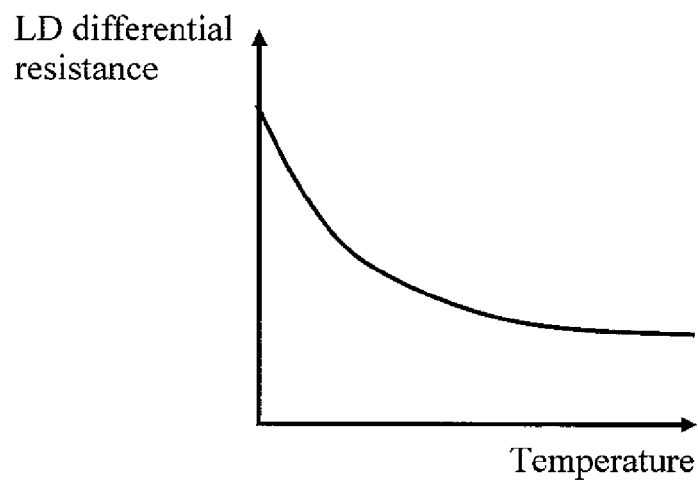
FIGS. 14A, 14B and 14C are graphs each showing dependency of the differential resistance of the LD on temperature, laser power or operation time.
Figure 14B:
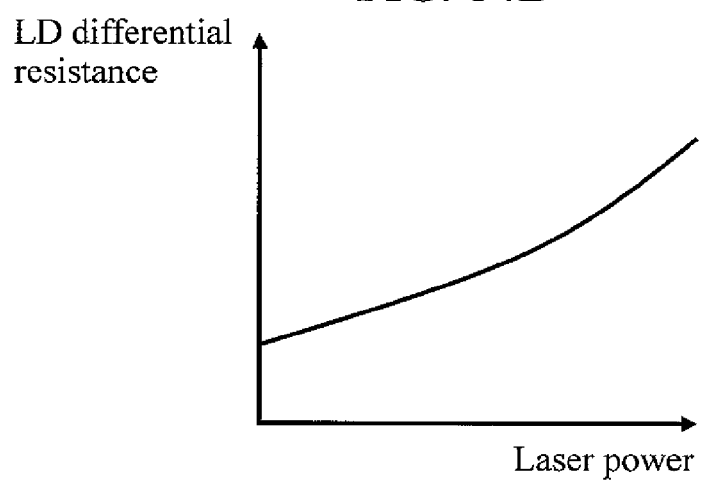
Figure 14C:
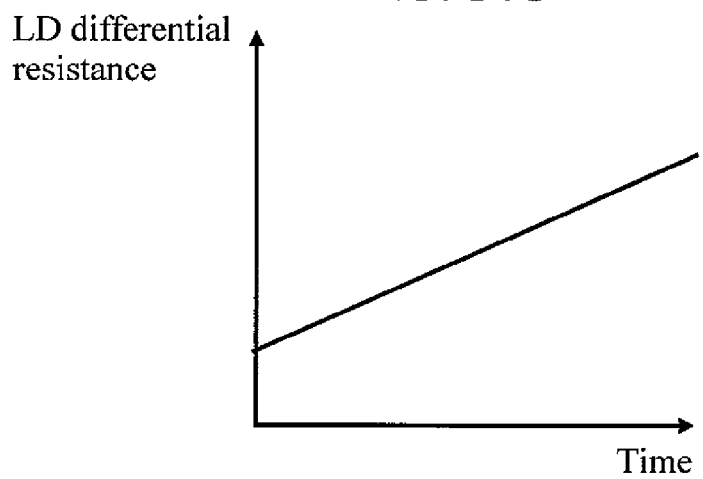

Next, an example of how to create a compensation table used in this sequence will be described. First, before shipping the drive, data on changes in the rise time/fall time and changes in the overshoot attributable to temperature, for example, are acquired as shown in FIGS. 13A and 13B. Causes of these changes are considered mostly to be the differential resistance of the LD. As shown in FIGS. 14A, 14B and 14C in a simplified manner, the differential resistance changes due to temperature, laser power (recording powers) and time during which the LD has been used (aged deterioration). Accordingly, a table is created to include parameter (register) values to be improved by adjustment as shown in FIGS. 13A and 13B, the parameter values determined for each condition of the causes (see FIG. 11 and FIG. 12). Aged deterioration can be reflected in Rd classification in FIG. 12 by managing, by the drive, the time during which the LD has been used, and creating a separate table for estimating a differential resistance value. Thus, a table is created with a certain number of parameters from a viewpoint of system design.

Embodiment 3

Embodiment 3 will be described by using FIG. 15.

If Embodiment 1 and Embodiment 2 are performed independently, sufficient accuracy may not be achieved in light-emission pulse control in some cases. In consideration of such a case, the light-emission pulse control based on a table described in Embodiment 2 is performed before OPC, and then the light-emission pulse control based on learning described in Embodiment 1 is performed after the OPC. A sequence of this case is as follows.

(1) As in Embodiment 1 and Embodiment 2, a relationship between an output current from the laser driver and laser emission is obtained by laser power adjustment.

(2) Then, as in Embodiment 2, light-emission pulse control is performed before OPC. In this event, register values for compensating rise/fall times and an overshoot (OS) are determined by referring to a table created on the basis of observed temperature, recording powers based on recommended recording powers of the disc, and differential resistance data on the LD included in the drive (see FIG. 12).

(3) Thereafter, OPC, which is optimization of the recording powers, is performed.

(4) Although strategy optimization is performed or recording is directly performed next in Embodiment 2, waveform control based on learning is performed in this embodiment. As described in Embodiment 1 with reference to FIG. 7 and FIG. 10, patterns are recorded by changing each register to be controlled, each recorded area is reproduced, and the optimal value of the control register is extracted on the basis of a desired index, in the waveform control learning. After the optimization of the register, the same optimization processing is performed on the next register to be optimized. Thus, one or more registers are optimized.

(5) The procedure advances to optimization of the strategy or directly to a recording operation, depending on the waveform optimized by the waveform control learning.

According to this embodiment, the accuracy of the OPC can be increased, and recording quality can also be improved compared with Embodiment 1 and Embodiment 2, in some cases.

Embodiment 4

In this embodiment, an example of performing light-emission pulse control during recording will be described. The temperatures of a LD and a drive are constantly observed by a temperature sensor during a recording operation by the drive. If a temperature change is observed which is larger than a certain range from a temperature at which waveform adjustment was performed, the recording is suspended to go back to an OPC area (an area in which test recording can be performed) of the disc for waveform adjustment. Then, the waveform control is performed in the flow shown in FIG. 1 or FIG. 15. This control employs one of the method based on a table, the method based on learning and the method based on a table+learning. A method to be employed may be chosen from the above methods, in consideration of a system margin, time limitation and the like. Alternatively, a system may be established which checks, for example, recording quality during recording, in addition to temperature detected by the temperature sensor, and which performs the waveform adjustment in the same manner if deterioration in recording quality is detected during recording.

Recording with the waveform after the adjustment is started again by returning to a data recording area after the waveform adjustment in the OPC area. Since this adjustment is an operation performed during recording, it is possible to employ only the method based on a table and to perform the waveform adjustment on the basis of a detected temperature without suspending the recording during the recording, if there is the time limitation of a system.

Embodiment 5

Figures 15, 16A, 16B:
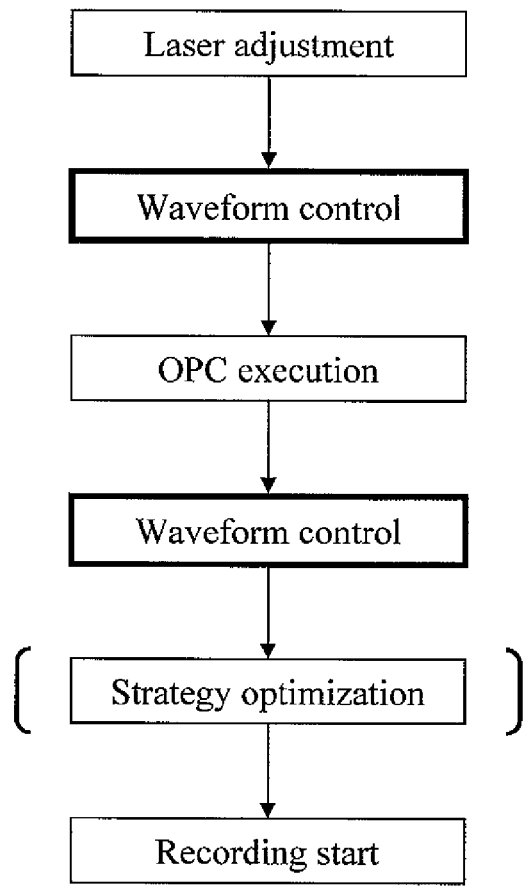
FIG. 15 is a flowchart showing a sequence when the waveform control according to the present invention is performed before and after OPC.
FIGS. 16A and 16B are views respectively showing examples of a random pattern and a special pattern.

As write patterns used for light-emission pulse learning of the present invention, random patterns as one shown in FIG. 16A are used. FIG. 16A shows a part of a random pattern containing 2 T to 8 T marks and spaces. In FIG. 16A, M denotes a mark and S denotes a space. However, to increase the accuracy of waveform learning, special patterns as one shown in FIG. 16B may be used in some cases. FIG. 16B shows a pattern containing only 3 T and 8 T marks and spaces.

Figure 17:
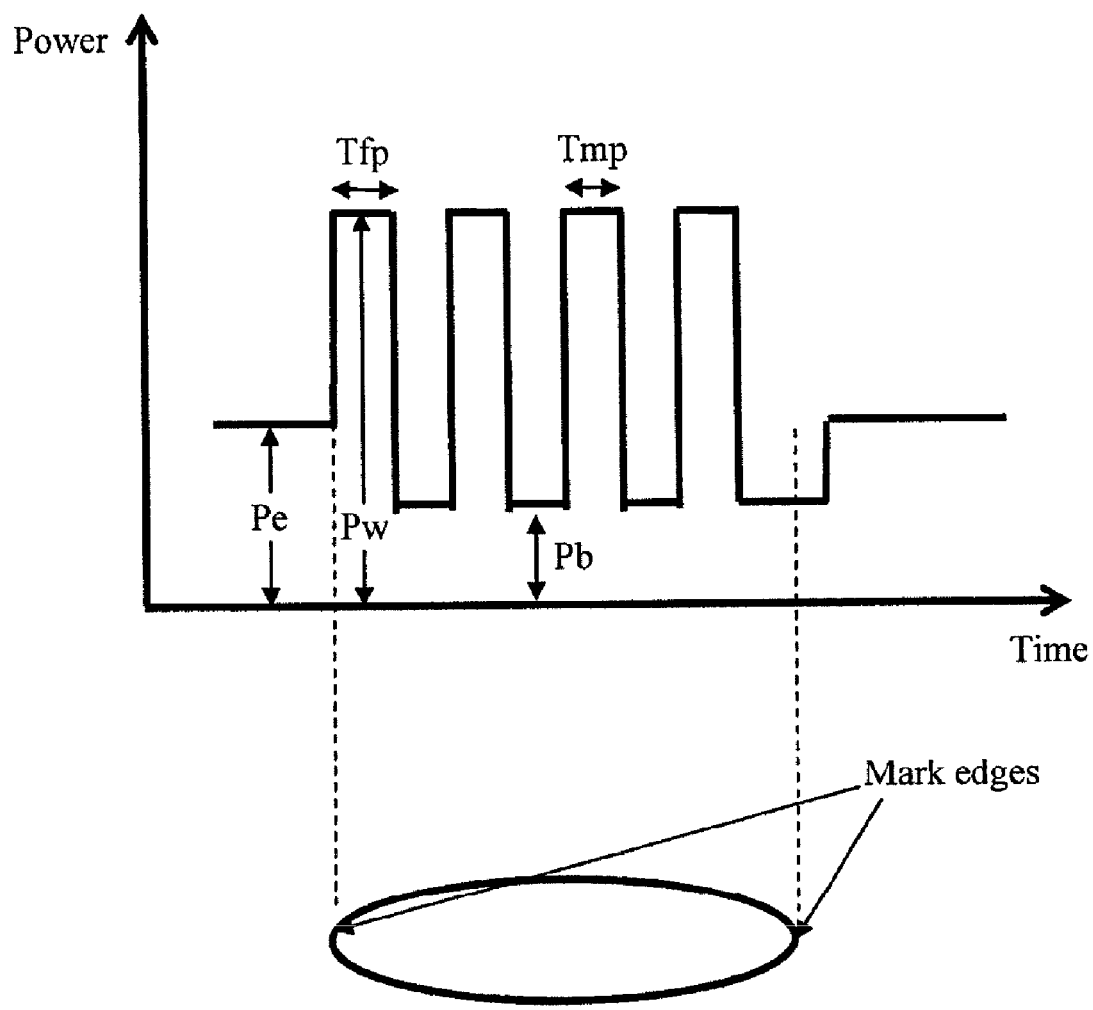
FIG. 17 is a view for explaining an example of a multipulse write strategy and a recording mark formed by this strategy.
Figure 18:
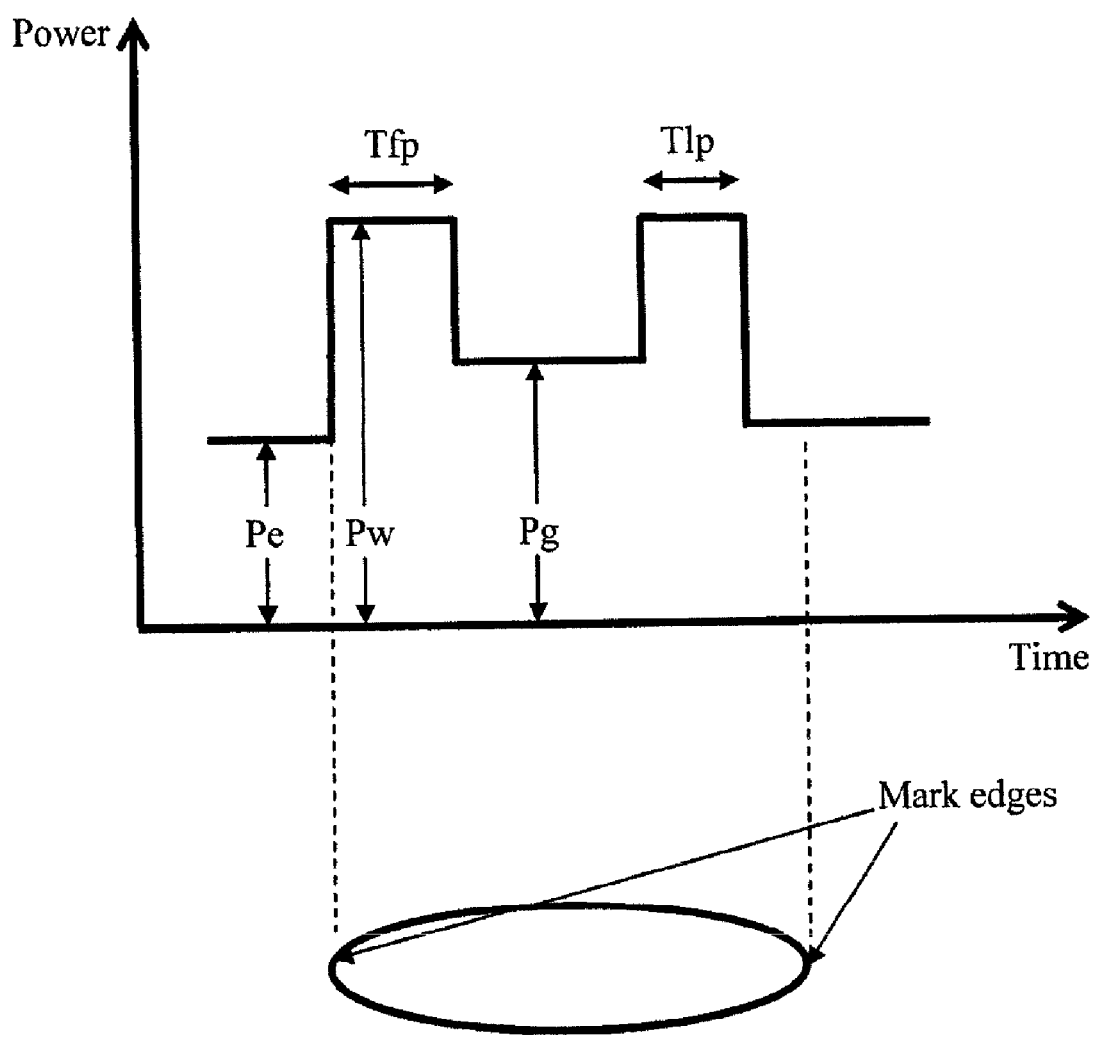
FIG. 18 is a view for explaining an example of a non-multi pulse (or castle pulse) write strategy and a recording mark formed by this strategy.
Figure 19:
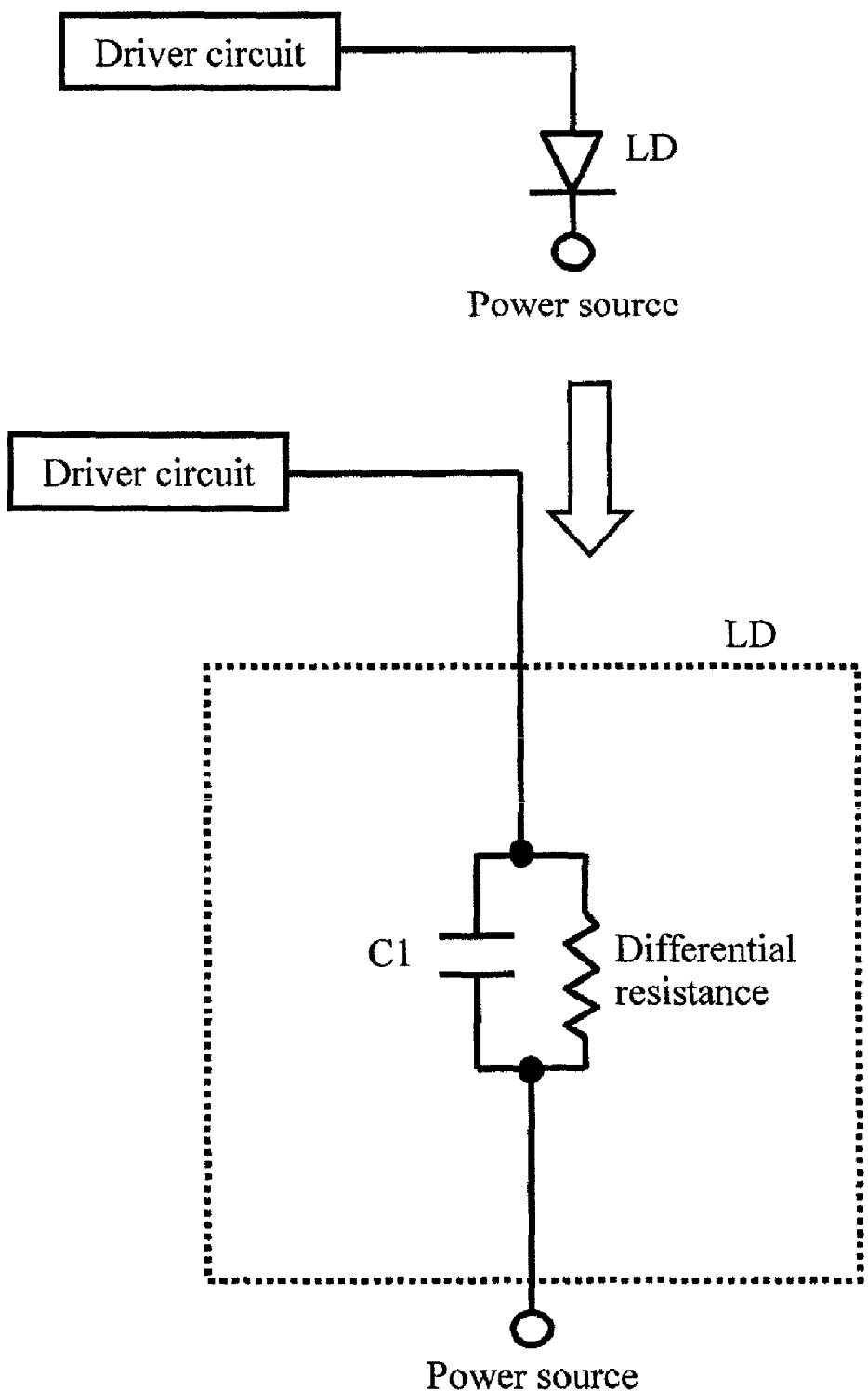
FIG. 19 is a diagram showing a circuit model from a laser driver to a LD.

For example, random patterns are recorded for waveform learning in the case of using a multipulse strategy shown in FIG. 17, while special patterns are recorded for waveform learning in the case of using a castle strategy shown in FIG. 18. Moreover, optical discs are divided into a write-once type (a BD-R if the disc is a BD) and rewritable type (a BD-RE). If waveform learning using different write patterns depending on the type of the optical disc achieves higher accuracy in the learning, a write pattern that is capable of achieving higher accuracy may be used for each disc type. Alternatively, write patterns may be changed for each of $T_r$, $T_f$ and OC controls. Further, two or more kinds of write patterns may also be used to obtain the optimal value of a single type of parameter control.

Embodiment 6

In constant angular velocity (CAV) recording, recording is performed with a constant angular velocity. Accordingly, recording velocity changes in a range from the inner circumference to the outer circumference. In this case, a strategy and write parameters such as recording powers are needed for each of multiple recording velocities. Waveform learning in this case is performed a certain number of times corresponding to the number of strategies or the number of test recording times, or is performed at least once at a representative recording velocity. Assume that the CAV recording is employed, the innermost circumference is 2.4×, the outermost circumference is 6×, and a strategy is set for each of 2.4× and 6×. In such a case, waveform learning may be performed twice in total for 2.4× and 6×, or may be performed once only for 6×. This determination belongs to the category of design, and can hence be made by the designer.

EXPLANATION OF REFERENCE NUMERALS

LD laser diode
10 optical disc
11 laser diode
12 LD driver
13 strategy generation circuit
14 coding circuit
15 recorded data
16 temperature sensor

What is claimed is:

1. An optical information recording method for recording information by emitting a pulsed laser beam from a laser light source and thus forming a recording mark on a recording medium, the method comprising the steps of:
   acquiring information on temperature, a recommended recording power of the recording medium and a differential resistance of the laser light source to be used;
   obtaining a register value corresponding to the acquired information, by referring to a table in which a register value to be set in a waveform control register of a laser driver which drives the laser light source is stored in association with a combination of the temperature, the recording power and the differential resistance of the laser light source;
   setting the obtained register value in the waveform control register of the laser driver;
   adjusting at least one of a rise period and a fall period of a light-emission pulse; and
   recording information by forming a strategy with a pulsed laser beam generated from the laser light source driven by the laser driver.

2. The optical information recording method according to claim 1, further comprising, between the step of setting the obtained register value in the waveform control register of the laser driver and the step of recording the information, the steps of:
   optimizing a recording power;
   performing test recording on the recording medium while substantially changing a light-emission pulse by changing the value set in the waveform control register of the laser driver which drives the laser light source and thus by changing a shape of a current pulse with which the laser light source is driven;
   reproducing information recorded in the test recording;
   obtaining an optimal value of the value set in the waveform control register, on the basis of a relationship between the value set in the waveform control register and a recording quality; and
   setting the optimal value in the waveform control register.

3. The optimal information recording method according to claim 1, wherein
   information recording is performed by constant angular velocity recording, and the optimal value of the value set in the waveform control register for a first recording velocity is obtained and stored as a first register value while the optimal value of the value set in the waveform control register for a second recording velocity is obtained and stored as a second register value, and thereby a register value for a third recording velocity is obtained from the first register value and the second register value, the third recording velocity being intermediate between the first recording velocity and the second recording velocity.

* * * * *